United States Patent Office 2,722,572
Patented Nov. 1, 1955

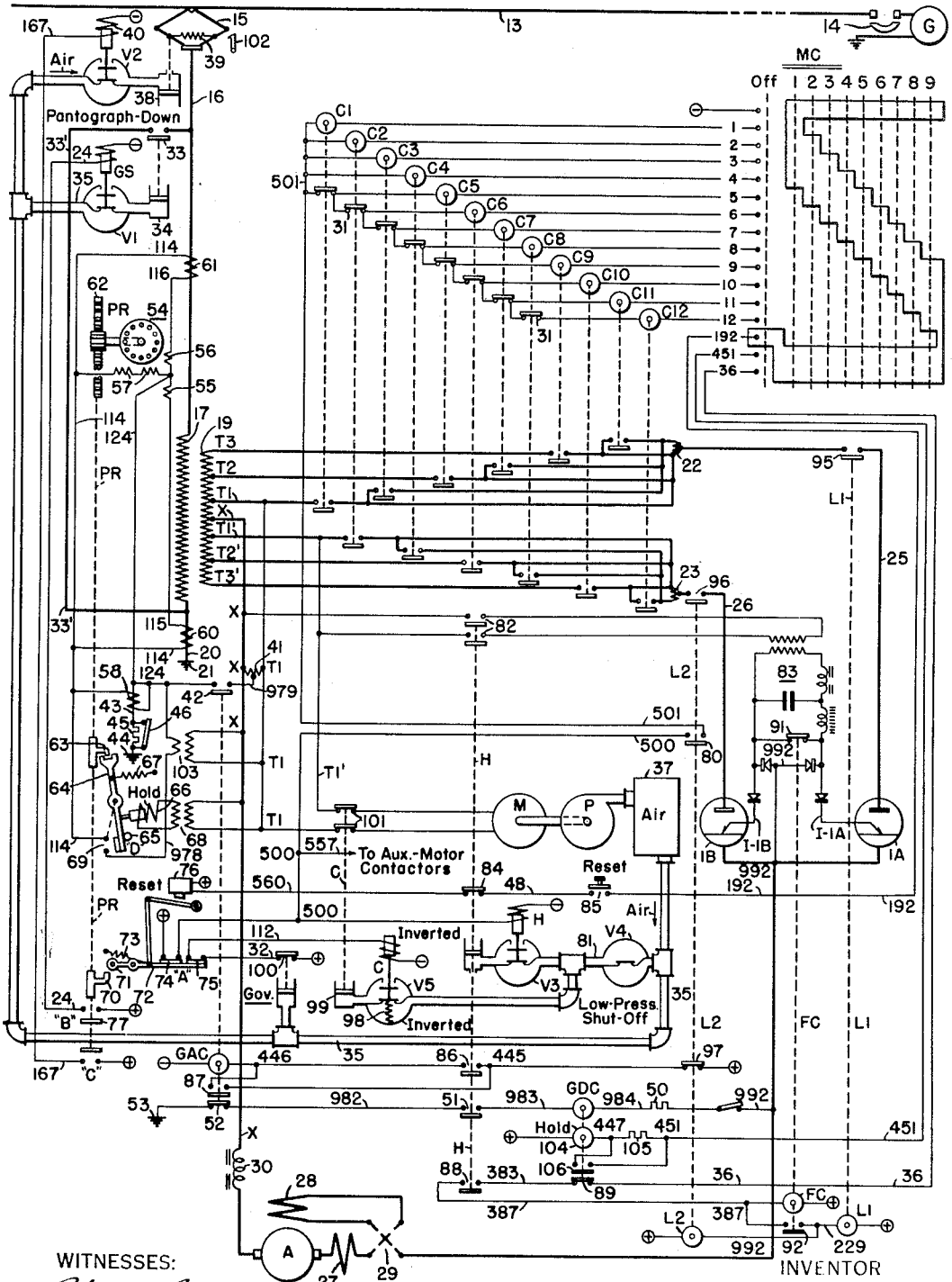

2,722,572

GROUND-PROTECTION MEANS FOR ELECTRIC LOCOMOTIVES

Lloyd J. Hibbard, Pittsburgh, Pa., assignor to Westinghouse Electric Corporation, East Pittsburgh, Pa., a corporation of Pennsylvania Application September 11, 1951, Serial No. 246,063

10 Claims. (Cl. 191—8)

My invention relates to the protection of electrically propelled locomotives or other vehicles, and it has particular relation to that type of vehicle, including practically all trolley-powered electric locomotives, in which space-limitations forbid the carrying of circuit breakers which are adequate to interrupt short-circuit currents in the vehicle. It has thus been the practice, for many years, to protect such vehicles, in case of short-circuits, by grounding the pantograph or other current-collecting means, thus forcing the substation breakers to remove power from the trolley-wire, after which, when it has been made certain that the power is off, the pantograph is lowered away from contact with the trolley-wire. Care must be taken not to lower the pantograph while a short-circuit current is flowing, as both the wire and the pantograph are certain to be seriously damaged by the resulting arc, and the wire may be melted in two, and brought down on the locomotive or on the right-of-way.

In such cases, it is universally the custom to use a power-operated pantograph-lowering means, which is driven from compressed air, or other vehicle-carried source of auxiliary-purpose power, which might also be a battery which needs to be charged, or a prime-mover-driven generator which needs to be brought up to operating speed. The same source of auxiliary-purpose power is also used for actuating the pantograph-grounding switch.

A short circuit on an electric locomotive is caused by a failure of the ground-insulation of the equipment, and most such short-circuit conditions result from the accidental presence of two grounds, at two circuit-portions having a difference of potential therebetween. In order to detect such an accidental ground, it is necessary to place an intentional grounding-connection on some portion of the circuit, and to provide a suitable ground-fault-protective relay which will respond to the fault-currents which then flow in the intentional grounding-connection upon the occurrence of an accidental ground at some other point. A protective relay of this kind is the so-called pantograph-relay which is described in Patent No. 2,106,844, granted February 1, 1938, on an application filed in 1934, by Harder, Taliaferro and myself.

Locomotives of the above-described type are dangerously vulnerable during the 15 or 20 minutes, more or less, which are required for pumping up air on a dead locomotive. It has happened, several times, that there has been an accidental ground-fault on such a locomotive, and that the consequential fault-currents have caused transformer-fires, and other damage, before the power-actuated pantograph-grounding switch could be actuated and the pantograph lowered.

It is an object of my invention, therefore, to provide a ground-protection equipment in which the intentional ground is substantially removed until air-pressure is available.

My invention also relates, more specifically, to the ground-protection of a rectifier-powered locomotive or vehicle, in which single-phase power is received, on the vehicle, and is transformed, by means of rectifiers, into direct-current power, which is fed to one or more direct-current traction-motors, as described and claimed in my copending application Serial No. 120,331, filed October 8, 1949, patented April 28, 1953, number 2,636,995. In such a vehicle, it is necessary or desirable to provide two ground-protective means, one being the alternating-current ground-protective relaying equipment, such as has just been mentioned, for the protection of the step-down power-transformers which are used on such vehicles, and the other ground-protective means being a direct-current ground-protective equipment, which may, in general principle, be similar to the ground-detection signaling systems which have heretofore been used to warn the engineman of the presence of an accidental ground in the direct-current traction-motor circuits of diesel-electric locomotives. In my rectifier-powered locomotive, I prefer to use an intentional direct-current grounding-circuit, on some part of the motor-circuit which is at different direct-current potential than the midpoint of the transformer secondary, while the traction-motors are operating, and to use alternating-current ground-protective means when the traction-motors are not operating.

The direct-current ground-detecting relay, which was previously used, on diesel-electric locomotives, merely to provide a signal-indication, is now used as a means for deenergizing the direct-current traction-motor circuits in the event of an accidental ground-fault either in the motor-circuits, or in the rectifiers, or in the secondary winding of the power-transformer. At the same time, the intentional direct-current grounding-circuit is opened and the intentional alternating-current grounding-circuit is closed, so that, if any particular ground-fault is not cleared by the deenergization of the direct-current circuits, the matter of ground-fault protection must be taken over by the pantograph relay, or alternating-current ground-fault protective means, ultimately resulting, if necessary, in a grounding of the pantograph, followed, when the substation breakers have opened, by an automatic lowering of the pantograph.

Modern power-rectifier systems commonly use single-phase ignitrons, which are rectifying devices of a type having suitable ignition-circuit means for making each rectifier-device conductive at the beginning of each conducting period. In such rectifying systems, when it is desired to deenergize the direct-current output-circuit of the rectifiers, it has been known, and is generally recognized as being desirable, to incapacitate the ignition-circuit means, as well as, or even in lieu of, opening a circuit-breaker or breakers in the direct-current output-circuit. In a rectifier-powered locomotive, in which the motor-load is deenergized by incapacitating the ignition-circuit means of the rectifiers in response to a ground-current flowing through the operating coil of a direct-current ground-detecting relay, the direct-current load is disconnected very quickly—in about one-quarter of a cycle of the alternating-current supply-line. This time is much smaller than the time necessary to open a direct-current circuit-breaker or line-switch, and it is too short a time to build up an adequate flux in a holding-coil, such as has previously been used on the ground-fault detectors on diesel-electric locomotives.

A feature of my present invention is, therefore, to energize the holding-coil of the direct-current ground-protecting relay with a steady current which is only slightly below the pick-up value, or approximately at the holding-in value, during the normal fault-free operation of the traction-motors, and to increase this holding-coil current to a safe or strong holding-in value, when said ground-protection relay is energized, thus permitting the holding-coil to build up its flux to the value necessary for holding the relay "in" or in its actuated condition, within the quarter-cycle time which is available for this purpose. In this way, I avoid the violent pumping (alternate opening and closing) of the direct-current protective relay and the direct-current circuit-breakers or line-switches.

With the foregoing and other objects in view, my invention consists in the circuits, systems, combinations, apparatus, parts, and methods of design and operation, hereinafter described and claimed, and illustrated in the accompanying drawing, the single figure of which is a diagrammatic view of much simplified circuits and apparatus illustrating the essential features of my present invention, and such other parts as necessarily cooperate therewith, and omitting all signalling-circuits and the many other refinements, and safeguards, and duplicates, and niceties of control and operation, such as are necessary in any modern locomotive, but which are not essential to an understanding of my present improvements.

The illustrated equipment includes a trolley-wire 13, which is energized from a substation which is represented by a single-phase generator G which is connected to the trolley-line 13 through an overload circuit-breaker 14. All the rest of the equipment which is shown on the drawing is a very great simplification of the equipment which is carried by one locomotive, which may be considered to be schematically indicated by means of a retractable pantograph 15, which may be raised or lowered into or out of engagement with the trolley-wire 13, so that it constitutes a retractable current-collecting means for moving along the trolley-wire 13, as the locomotive moves. The trolley-wire 13 is representative of any external alternating-current power-supply line for the locomotive. The pantograph 15 is connected, on the locomotive, to the high-voltage lead 16 for the primary winding 17 of a step-down power-transformer, which is also provided with a multitapped secondary winding 19. The primary winding 17 has a low-voltage lead 20 which is grounded at 21.

The secondary winding 19 has a midpoint tap X, on one side of which are a plurality of voltage-changing taps T1, T2 and T3, of successively increasing voltages, and on the other side of the midtap X, there are corresponding voltage-changing taps T1', T2' and T3'. These secondary taps are used, in connection with tap-switches or contactors C1 to C12, and preventive coils 22 and 23, to provide a variable voltage for the anode-leads 25 and 26 of two ignitrons 1A and 1B, which may be regarded as being representative of any suitable kind of power-rectifiers of a type having ignitor or ignition-circuits I–1A and I–1B for making each rectifier conductive at the beginning of each conductive period. The cathode-circuits of the two rectifiers are connected together, in a common circuit 992 which constitutes the positive terminal of the direct-current output-circuit of the rectifiers. While I have described the rectifier-connections in their usual polarity, it will be understood, of course, that the polarities might have been reversed, so that the anode-leads 25 and 26 would then become cathode-leads, while the common cathode-terminal 992 would then become a common anode-terminal. The other terminal of the direct-current output-circuit of the rectifiers is the midpoint tap-connection of the secondary winding 19.

The direct-current output-terminals 992 and X are used to energize one or more direct-current traction-motors, which are represented by an armature A, a serially-connected interpole-winding 27, and a main-field winding 28, the latter being connected in series with the armature A through a reverser 29. The motor-circuit also commonly includes a ripple-reducing choke-coil 30.

It is necessary to use some sort of motor-controlling switching-means for controlling the motor-operation and the motor-speed. In the drawing, this controlling-means is represented by two anode-breakers or line-switches L1 and L2, the twelve tap-switches C1 to C12, and a master controller MC, the whole system being very much simplified to its simplest possible form which is deemed adequate for illustrating the principles of my present invention. The master controller MC controls the operation of the tap-switches C1 to C12 through suitable interlocks 31, which are intended to be a schematic representation or suggestion of the intricate interlocking-system which is more particularly described and claimed in my copending application Serial No. 232,811, filed June 21, 1951, now Patent No. 2,691,748.

My present invention relates to an improved means for protecting such a locomotive, or other types of electrically propelled locomotives, against short-circuits such as are usually caused by accidental grounds. As previously intimated, there is never allocated any room, on such locomotives, for an overload circuit-breaker which is heavy enough to interrupt a fault-current in the locomotive. Such fault-currents as cannot be cleared in any other way, are cleared from the locomotive by mounting, on the roof, a pantograph-grounding switch GS, having a contact 33 which connects the high-voltage pantograph-lead 16 to the grounded low-voltage lead 20 through a circuit 33'. The grounding-switch GS is an electrically controlled, pneumatically operated switch, as are also some of the other heavy-duty switches or contactors, such as the tap-switches C1 to C12 and the line-switches L1 and L2. For the purpose of more clearly illustrating my invention, this pantograph-grounding switch GS is shown, on the drawing, as being a pneumatically operated switch, comprising an electrically controlled valve V1 for admitting compressed air to a cylinder 34 for closing the switch-contact 33. The valve V1 is provided with a magnet-coil, which may be identified by the same letters, GS, which identify the switch itself.

The GS ground-switch valve V1 receives compressed air through piping 35 which is connected to a compressed-air tank 37, which is carried by the locomotive, and which is normally kept pumped up by means of a pump or compressor P which is driven by a suitably controlled compressor-motor M.

This compressed-air tank 37 may be regarded as being symbolic of any suitable locomotive-carried source of auxiliary-purpose power, for actuating any desired auxiliary or non-traction equipment on the locomotive. It is to be understood, of course, that, so far as my present invention is concerned, I am not limited to the kind of vehicle-carried auxiliary-purpose power which is provided, but only by the fact that there is some kind of auxiliary-purpose power which is sometimes in need of replenishment, particularly when an engineman first enters a "dead" locomotive and starts to put it into operating-condition after a considerable period of idleness. The source of auxiliary-purpose power might also be exemplified, for example, by the locomotive-battery, which is represented on the accompanying drawing by means of its positive and negative terminals (+) and (−), and which is used for energizing the various relay-coils or contactor-controlling coils or magnet-valve coils, as this battery is an auxiliary-power source which may need charging or replenishing when a "dead" locomotive is first energized.

Means must also be provided for at times automatically retracting or lowering the pantograph 15 so that it will be out of contact with the trolley-wire 13; and this is done, in the illustrated apparatus, by means of a pantograph-down valve V2, which admits compressed air to a piston-cylinder 38 which lowers the pantograph 15 against the tension of its raising-spring 39. The pantograph-lowering valve V2 is opened by means of a valve-magnet coil 40.

In order to detect faults or accidental grounds in a locomotive, it is usually necessary to provide an intentional grounding-circuit at some selected point in the secondary-winding circuit. In my rectifier-powered locomotive, I prefer to use two intentional grounding circuits, only one of which is used at a time.

When the traction-motor circuit is not energized, it is desirable to use the kind of grounding-circuit which is commonly used in all trolley-powered alternating-current locomotives. This is an alternating-current grounding-circuit which is connected at some selected intermediate potential-level on the secondary winding 19, preferably near the midtap point X. In the drawing, this intentional alternating-current grounding-circuit is shown between the secondary taps X and T1, being provided by means of an autotransformer 41 having a midtap 979, which is connected to a circuit 124 through the make-contact 42 of a changeover ground-circuit relay GAC. The conductor 124 is connected through a grounding circuit 43 to a ground 44, usually through a grounding resistor 45 which is normally shunted by a ground-cutout switch 46. This intentional alternating-current grounding-circuit 979—42—124—43—46—44 reduces the voltage-strains to ground, on the transformer-secondary 19, and upon such auxiliary motor-equipment as is energized from secondary taps near the midpoint X, but if this grounding-circuit were left on, during the traction-motor operation, it would force the rectifier cathode-circuit 992 and the motor-fields 27 and 28 to the full direct-current voltage above ground, thus imposing voltage-strains on the ground-insulation of these parts.

When the traction-motor is operating, I prefer to open the intentional alternating-current grounding-circuit and to substitute an intentional direct-current grounding-circuit which is connected to some selected part of the direct-current traction-motor circuit, preferably a part having a direct-current potential which is substantially different from the midpoint of the secondary winding when the traction-motor A is in operation. This direct-current grounding-point may be at some intermediate direct-current potential or, when there is only one traction-motor per pair of rectifiers, as shown, the rectifier cathode-circuit 992 may be intentionally grounded, through a grounding resistor 50, which is in turn connected, through a circuit 984, to the operating coil GDC of a direct-current ground-fault detector which is designated by the same letters, GDC. From the coil GDC, the direct-current grounding-circuit continues, through a conductor 983, to a make-contact 51 of an auxiliary relay H, and thence, through a conductor 982, to a back-contact 52 of the ground-circuit changeover switch GAC, and thence to the ground 53. The operating coil GDC of the direct-current ground-circuit detector is thus responsive to the ground-fault currents which will flow in the intentional direct-current grounding-circuit 992—984—983—982—53 whenever there occurs an accidental ground at any other point in the secondary-winding circuit of the main power-transformer 17—19. This direct-current grounding-circuit places the rectifier cathodes and the traction-motor fields at ground potential, thus reducing the ground-insulation strains on these parts, but it raises the potential on the ground-insulation of the transformer-secondary 19 and on the auxiliary motor-equipment which is energized from near the midpoint X of the transformer.

As an alternating-curent protective-relay means, I prefer to use the pantograph-relay which has been used successfully for many years, one form of which is shown in the previously mentioned Harder et al. patent. This relay is shown to the left of the transformer-primary 17, and it is designated by the usual letters PR. It is driven by a shaded-pole single-phase motor 54 having two so-called overload-coils 55 and 56 and two so-called differential coils 57. The two overload-coils 55 and 56 are connected in series, with their intermediate connecting-point connected to the previously-mentioned conductor 124, the outer terminals of the coils 55 and 56 being connected to conductors 115 and 116, respectively. The two differential coils 57 are connected between the conductor 124 and a conductor 114, this connection including the secondary of a current transformer 58, the primary of which is connected in the intentional alternating-current grounding-circuit 43. The conductors 115 and 116 are connected to the respective inner terminals of two current transformers 60 and 61 which are located respectively in the grounded low-potential lead 20 and in the high-voltage pantograph-lead 16 of the primary winding 17. The outer terminals of the current transformers 60 and 61 are connected to the conductor 114.

The pantograph relay PR thus responds to the various types of alternating-current faults which may occur on the main power-transformer 17—19. An overcurrent-condition energizes the overload-coils 55 and 56, and thus causes a response of the pantograph relay PR. If an accidental ground should occur in the primary circuit 17 of the power-transformer, an unbalanced current-flow will occur in the two current transformers 60 and 61, thus energizing the differential coils 57, and again causing a response of the pantograph relay PR. On the other hand, if an accidental secondary-circuit ground should occur at any point other than the intentional alternating-current grounding-circuit 41—979—42—43—44, the resulting ground-current will flow through the current transformer 58, again energizing the differential coils 57, and again causing a response of the pantograph relay PR.

The PR motor 54 drives the moving parts of the pantograph-relay PR through a suitable reduction-gear, and these moving parts are diagrammatically represented in the drawing in a developed view, which represents the moving element of the pantograph-relay PR as moving vertically, against the bias of gravity, although, in actual practice, the moving parts will be on a rotating disc, as shown in the Harder et al. patent. The reduction-gearing for the PR motor 54 is shown, therefore, as a rack-and-pinion gearing 62 which lifts the moving parts of the relay. First, there is a latch-dog 63 which engages a pivoted latch-arm 64 so as to normally hold the moving parts of the PR relay at a point which is about a third of the way up from the lowermost position to the topmost position of which the moving parts are capable. The latch-arm 64 is normally held in its latching position, against a stop 65, by means of a holding-coil 66, against the bias of a spring 67 which tends to move the latch-arm 64 out of engagement with the latch-dog 63, whenever said dog is raised out of the notch at the end of the latch-arm.

The PR holding-coil 66 is normally energized whenever the main transformer is energized, as by being energized from the secondary-taps X and T1. When my locomotive is provided with a direct-current grounding-circuit 992—60—984—(GDC coil)—983—51—982—52—53, it is desirable to interpose an insulating transformer between the PR holding-coil 66 and the secondary leads X and T1, as indicated at 68, so as to relieve this hold-coil from any extra ground-insulation strains when the direct-current grounding-circuit is in use.

The PR latch-arm 64 carries a normally open contact 69, which is usually called the "D" contact of the pantograph-relay PR. This contact is open when the latch-arm 64 is engaged by the dog 63, or when the hold-coil 66 is energized.

Below the latch-dog 63, the moving element of the pantograph-relay PR is shown as being provided with a tripping dog 70 which engages a roller 71, as the PR relay continues to move after disengaging the latch-dog 63 from the latch-arm 64. The roller 71 is carried by a pivoted contact-arm 72, and moves this arm past the dead center of its biasing spring 73, so as to trip said contact-arm and open its normally closed contacts 74 and 75, which are commonly known as the "A" contacts of the pantograph-relay PR. This contact-arm 72 can be reset to its normal closed position, by means of a reset-coil 76.

Below the tripping-dog 70, the moving member of the PR relay is shown as having a final contact-making means, which is diagrammatically represented as the moving contact-member 77 of the so-caled "B" contact which is closed when the PR relay reaches the furthest limit of its actuated movement, which ocurs after the "A" contact-arm 72 has been tripped.

If the PR latch-holding coil 66 should become deenergized after the latch-dog 63 has been disengaged from the latch-arm 64, the PR motor coils 55, 56 and 57 being simultaneously deenergized, the moving element of the PR relay will return (drop, in the illustrated diagram) back past its illustrated normal latched position and will keep on going until it closes a so-called "C" contact which is shown at the extreme lower end of the moving element of the PR relay.

Whenever the pantograph-relay PR trips its "A" contact arm 72, its opened contact 74 deenergizes all of the tap-switches C1 and C12 by opening the circuit between the positive battery-terminal (+) and a conductor 500 which is connected to the positive supply-line 501 of the tap-switch coils C1 to C12, through an L2-in interlock 80, which is closed when the line-switch L2 is closed.

The conductor 500 is also connected to the valve-magnet coil H of an auxiliary, pneumatically operated relay which is designated by the same letter, H, so that the deenergization of the conductor 500 by the PR "A" contact 74 will deenergize this relay H. The relay H has a valve V3 which is energized from a compressed-air line 81 through a shut-off valve V4 which is connected to the main air-line 35, but which keeps air-pressure out of the line 81 until the pressure in the main air-line 35, and in the air-tank 37, has reached a certain minimum value which is sufficient to operate the ground-switch valve V1 and the pantograph-lowering valve V2. It will be understood that this auxiliary relay H thus acts as a pressure-responsive relay, which is not energized when an adequate air-pressure supply is not available on the locomotive, and this same relay is also deenergized whenever the PR "A" contact 74 is tripped open.

When the auxiliary relay H is in its deenergized position, as illusrated, it does several things. Starting at the top of the moving element of the H-relay, as shown in the drawing, this relay is provided with two make-contacts 82 which are open when the relay is deenergized, thus disconnecting the excitation-apparatus 83 of the rectifiers 1A and 1B from the transformer-taps X and T1' from which it is normally energized.

Next, on the H-relay, is a back-contact 84 which, in the deenergized position of the relay, connects a conductor 48 to one of the terminals 560 of the PR reset-coil 76 so as to make it possible for this reset coil to be energized when the engineman returns his master controller MC to the "off" position, and then depresses a reset-pushbutton 85, thus completing the reset-circuit from the conductor 48 through the reset-button 85, a conductor 192, and the master controller MC.

Continuing the description of the H-relay contacts, we come to a contact 86, which is open when the H-relay is deenergized, thereby opening a circuit between two conductors 445 and 446, making it impossible to initially energize the operating-coil GAC of the grounding-circuit transfer-relay GAC. This H-relay contact 86 is by-passed by a holding-circuit 87 on the GAC switch, so that the dropping out of the H-relay will not deenergize the GAC switch if it was already energized.

The next contact of the H-relay is the previously mentioned make-contact 51, which, when the H-relay is deenergized, opens the direct-current ground-circuit between the points 992 and 53.

At the bottom of the H-relay contact-carrying element, there is a make-contact 88 which, if the master controller MC is on any of its on-positions, when the H-relay becomes deenergized, will deenergize a circuit 387, which will in turn deenergize the operating coil FC of a firing-circuit relay FC, as well as the operating coils L1 and L2 of the two line-switches L1 and L2. Thus, from the negative terminal (—) at the master controller MC, a circuit can be traced through the conductor 36, a back-contact 89 on the direct-current ground-detector relay GDC, a conductor 383, the H-relay contact 88, the conductor 387, and the operating coil FC, to the positive terminal (+).

When the firing-circuit relay FC is deenergized, it closes a back-contact 91, which short circuits the excitation-apparatus 83, making it impossible for either rectifier tube 1A or 1B to fire again thereafter. When the firing-circuit relay FC is energized, it closes a make-contact 92, which closes a circuit between the conductor 387 and a conductor 229 which energizes the two line-switch operating-coils L1 and L2.

When these line-switches L1 and L2 are energized, they close their respective main-circuit contacts 95 and 96 in the anode-circuits 25 and 26, respectively. The line-switch L2, when it is closed, also closes its previously mentioned make-contact 80, or L2-in interlock in the positive supply-circuit 501 of the tap-switches C1 to C12, and it also opens a back-contact 97, or L2-out interlock, in series with the conductor 445 in the energizing-circuit of the ground-circuit changeover-switch GAC.

Coming back to the tripping of the pantograph-relay "A" contact 74, it will be noted that the deenergization of the circuit 500 also deenergizes a branch-circuit 557 which is used to deenergize other auxiliary-motor contactors, as indicated by legend in the drawing, thereby deenergizing blower-motors and other equipments (not shown) which normally receive their energization from the transformer-secondary 19.

The purpose of the PR "A" contacts 74 and 75 is to deenergize all equipment which is normally connected to the transformer, so that, if the fault which is detached by the PR relay is in that equipment, rather than being in the transformer itself, such a fault will be cleared by the tripping of the "A" contact-arm 72, thereby permitting the PR relay instantly to return to its original normal position, which is shown in the drawing, and permitting the engineman to reset the tripped "A" contact-arm 72, by means of his pushbutton 85, after he has made the proper investigation to ascertain the cause of the fault.

The other PR "A" contact 75, which is open when the "A" contact-arm 72 is tripped, deenergizes a terminal 112 of an inverted magnet-coil C of an inverted pneumatic compressor-controlling relay or contactor having the same letter-designation C. This compressor-controlling contactor C has a valve V5 which is spring-biased, at 98, toward an open position, wherein air is fed from the air-line 81 to a piston-chamber 99. The C-contactor valve V5 is closed whenever the magnet-coil C is energized. The energizing-circuit for this magnet-coil C includes the conductor 112, the "A" contact 75, and also a conductor 32 and a contact 100 of a governor Gov. which is energized from the air-line 35 so as to deenergize the magnet-coil C, and thus admit air to the C-relay piston-chamber 99, whenever the air-pressure reaches its desired value which is to be maintained in the air-tank 37. When the piston-chamber 99 of the compressor-controlling relay C is energized with compressed air, it opens its two contacts 101 and disconnects the compressor-motor M from its supply-lines which are the transformer-taps T1 and T1', respectively.

If the fault which caused the pantograph-relay PR to trip its "A" contacts 74 and 75 is cleared by the tripping of said contacts, the engineman, after ascertaining and removing the cause of the fault, can reset the "A" contact-arm 72 by means of his reset-pushbutton 85, as above described.

If, however, the fault is in either one of the transformer windings 17 or 19, the fault-current will continue to flow after the PR "A" contact-arm 72 has been tripped, and the pantograph-relay PR will continue its movement to the very end, at which time it will close its "B" contact 77, thus energizing a circuit 24 which will energize the ground-switch magnet-coil GS, thereby causing the pantograph grounding-switch GS to ground the pantograph 15 at its switch-contact 33. This short-circuits the external power-source which is represented by the trolley-wire 13, and the fault-current continues to flow through the current-transformer 60 in the grounded conductor 20, thereby keeping the pantograph-relay PR energized, and holding its "B" contact 77 closed, until the trolley-wire 13 has been deenergized by the opening of the substation breaker 14.

When the substation breaker 14 opens, the pantograph-relay PR now receives no energy at all, neither in its motor 54, nor in its latch-arm holding-coil 66, so that the latch-arm 64 is spring-opened, and the pantograph-relay PR returns all the way to its lowermost position, at which point it closes its "C" contact, and energizes a circuit 167 which energizes the magnet-coil 40 of the pantograph-lowering valve V2. In this manner, it is made certain that all power is off of the trolley-wire 13 before the pantograph 15 is lowered, thereby avoiding the danger of drawing a destructive arc when the pantograph is lowered. When the pantograph 15 is once lowered, it is latched down, as by means of a latch 102. After this occurs, the situation demands the personal attention of the engineman, and the duty of the automatic equipment ceases.

When power again comes back on the trolley-wire 13, while the pantograph-relay PR is in its lowermost position, and while its latch-arm 64 is spring-biased to its contact-closing position, wherein it closes its "D" contact 69, the PR motor 54 is again energized, in a circuit extending from the motor-conductor 114 through the "D" contact 69, a conductor 978, and the secondary of an auxiliary transformer 103, and thence back to the circuit 124 of the pantograph-motor 54. The auxiliary transformer 103 is energized from the secondary conductors X and T1 of the main power-transformer 17—19, so that it will receive power whenever the pantograph 15 is again raised into contact with a live trolley-wire 13. The "D" contact 69 of the PR relay is designed so that it will remain closed until the PR latch-dog 63 returns to a position above the latch-arm 64, at which time the latch-holding coil 66 will be permitted to return the arm to its normal latching position, the relay-resetting "D" contact 69 will deenergize the PR relay, and the latch-dog 63 will reseat itself in the forked end of the latch-arm 64.

The direct-current ground-detector relay GDC has a hold-coil 104, which is energized, across the battery-terminals (+) and (—) through a conductor 447, a resistor 105, a conductor 451, and all of the on-positions of the master controller MC. The value of the resistor 105 is such that the current through the hold-coil 104 is approximately at, or just below the holding-in value at which this coil alone would be able to hold the direct-current ground-protector relay GDC in its actuated position, once it has been actuated, even after its main operating-coil GDC has been deenergized. As shown, the two coils GDC and 104 are on separate magnetic circuits, each with its own armature which is represented by a small circle within the circle which represents the coil, these two armatures being both connected to the movable contact-carrying element of the relay. It will be understood, however, that both coils could be on the same magnetic circuit.

It will be recalled, and is evident from the drawing, that the direct-current grounding-circuit connection is completed, between the cathode-circuit 992 and the ground 53, upon a closure of both the make-contact 51 of the auxiliary relay H and the back-contact 52 of the ground-circuit change-over switch GAC. The make-contact 51 is closed whenever the auxiliary relay H is energized, that is, whenever there is an adequate air-pressure effective on the low-pressure shut-off valve V4, while at the same time the PR "A" contact 74 is closed. The direct-current ground-circuit contact 52 is closed whenever the ground-transfer relay GAC is deenergized.

To initially energize the ground-transfer relay GAC requires an off-position of the line-switch L2, closing its out-interlock 97, as well as an energized position of the auxiliary relay H, closing its make-contact 86. However, once this GAC relay is energized, its holding-circuit 87 keeps said relay energized, regardless of the condition of the H-relay, until the line-switch L2 is energized, which occurs at the time when the traction-motor A is being energized or operated. When this occurs, the L2-out interlock 97 deenergizes the ground-transfer relay GAC, causing it to open its alternating-current grounding-connection 42, and to close its direct-current grounding-contact 52, thus opening the alternating-current grounding circuit from 979 to 44, and closing the direct-current grounding-circuit from 992 to 53.

If, while the traction-motor A is in operation, and while the cathode-circuit 992 is intentionally grounded as just described, an accidental ground should occur at any other point in the secondary-winding circuit of the main power-transformer 17—19, a ground-circuit fault-current will flow through the intentional direct-current grounding-circuit which contains the operating coil GDC of the direct-current ground-detector GDC, thus actuating said detector and opening its back-contact 89, which instantly deenergizes both the firing-circuit relay FC and the two line-switches or anode-breakers L1 and L2. This holds true, notwithstanding the fact that the master-controller lead 36 is energized, for energizing these elements, since the traction-motor A is operating and the master controller MC is then on one of its on-positions 1 to 9.

The deenergization of the line-switches L1 and L2 would deenergize the traction-motor A, but these line-switches are heavy contactors, which are not as quick, in their operation, as the firing-circuit relay FC which, when deenergized, closes its back-contact 91, which short circuits (or otherwise incapacitates) the ignition-energy supply-means 83 for the igniter-circuits I—1A and I—1B of the two rectifiers 1A and 1B, thus preventing each of said rectifiers from refiring again at the beginning of another half-cycle of the alternating-current supply-line 13. The firing-circuit relay FC thus deenergizes the direct-current traction-motor A very quickly, say in something like one quarter of the supply-line cycle, after an actuation of the direct-current ground-detector GDC and the consequent deenergization of said firing-circuit relay FC.

As soon as this direct-current ground-detector relay GDC is actuated, it closes a make-contact 106 which by-passes the resistor 105 and increases the current through the holding-coil 104 to a value at which it will safely hold the relay in its actuated position, even when its main operating-coil GDC is deenergized by the interruption of the current through the rectifiers 1A and 1B. Since it is much easier to slightly increase the magnitude of the magnetic flux in the hold-coil 104, than to build it up from zero to an effective relay-holding value, I thus make sure that the direct-current ground-fault relay GDC does not drop out again as soon as the cathode-circuit 992 is deenergized.

While I have shown alternative grounding-circuits, under the selective control of a changeover-switch GAC, it is to be understood that either the alternating-current grounding-circuit 979 to 44, or the direct-current grounding-circuit 992 to 53 could be omitted. It may be noted that the alternating-current grounding-point 979 is at one end of the direct-current traction-motor circuit, while the direct-current grounding-point 992 is a part of the secondary circuit, and if this direct-current grounding-point 992 is grounded when the rectifiers are deenergized, it will hold the secondary midtap X at ground-potential through the direct-current traction-motor circuit between X and 992.

While I have shown and described my invention in a single illustrative form of embodiment, and in an extremely simplified form of embodiment, which is intended to clearly indicate the essential principles of my invention, without confusing details, I wish it to be understood that an actual locomotive-installation will be very much more complicated, involving the duplication or multiplication of parts, and the addition of many ancillary features and details which contribute to the safe and satisfactory performance of the locomotive or other electrically-propelled vehicle. I also wish it to be understood that my invention is not altogether limited to a rectifier-powered locomotive, or to a trolley-powered locomotive. In short, I wish it to be understood that the essential spirit of my invention will not be avoided by many obvious changes, such as the omission or addition of parts, or the substitution of equivalents. I desire, therefore, that the appended claims shall be given the broadest construction consistent with their language.

I claim as my invention:

1. An electrically propelled vehicle having traction-motor means, a retractable current-collecting means for moving along an external alternating-current power-supply line, motor-energizing means including a transformer having a primary winding energized from said current-collecting means, and a secondary winding for supplying power for said traction-motor means, power-actuated retraction-means for at times retracting said current-collecting means out of contact with its external power-supply line, a vehicle-carried source of auxiliary-purpose power for actuating said retraction-means, means for providing an intentional grounding-circuit at some selected point in the secondary-winding circuit, a collector-short-circuiting means for at times providing a short-circuiting circuit across said power-supply line, said short-circuiting circuit including said retractable current-collecting means, and a protective-relay-means responsive to fault-currents in the intentional grounding-circuit due to an accidental ground at some other point, said protective-relay-means including means for causing an actuation of said collector-short-circuiting means, and further including means for then, in response to a cessation of substantial current-flow in said short-circuiting circuit, causing an energization of said retraction-means to actuate the same; said vehicle being characterized by having also, in combination with the items just mentioned, an auxiliary control means having an actuating-means which is responsive to the condition of operativeness of said vehicle-carried source of auxiliary-purpose power, said auxiliary control-means also having controlled-contact-means adapted to cause the initial completion of said intentional grounding-circuit only at a time when said vehicle-carried source of auxiliary-purpose power is in a satisfactory operating-condition.

2. The invention as defined in claim 1, characterized by the protective-relay-means including means for first preventing the energization of the traction-motor means, and means for then, if a fault-current still continues, causing the actuation of said collector-short-circuiting means.

3. A rectifier-powered vehicle having direct-current traction-motor means, a rectifier-assembly comprising at least two single-phase rectifying devices, a retractable current-collecting means for moving along an external alternating-current power-supply line, a transformer having a primary winding energized from said current-collecting means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current traction-motor circuit, said secondary winding having a mid-point connection which constitutes the other terminal of the direct-current traction-motor circuit, power-actuated retraction-means for at times retracting said current-collecting means out of contact with its external power-supply line, a vehicle-carried source of auxiliary-purpose power for actuating said retraction-means, means for providing an intentional grounding-circuit at some selected part of the direct-current traction-motor circuit, said part having a direct-current potential which is substantially different from the mid-point of the secondary winding when the traction-motor means is in operation, and a protective-relay means responsive to fault-currents in the intentional grounding-circuit due to an accidental ground at some other point, said protective-relay-means including means for causing a de-energization of said traction-motor circuit, and an auxiliary control means having an actuating-means which is responsive to the condition of operativeness of said vehicle-carried source of auxiliary-purpose power, said auxiliary control-means also having controlled-contact-means adapted to remove said intentional grounding circuit when said vehicle-carried source of auxiliary-purpose power is not in a satisfactory operating-condition.

4. A rectifier-powered vehicle having direct-current traction-motor means, a rectifier-assembly comprising at least two single-phase rectifying devices, supply-means for providing single-phase power on the vehicle, a transformer having a primary winding energized from said supply-means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current traction-motor circuit, said secondary winding having a mid-point connection which constitutes the other terminal of the direct-current traction-motor circuit, motor-controlling switching-means for controlling the motor-operating energization of each of said rectifying devices from said secondary winding, said motor-controlling switching-means having an actuating-means, means for at times providing an intentional alternating-current grounding-circuit at some selected intermediate potential-level on the secondary winding, and ground-circuit switching-means having an actuating-means which is responsive to the condition of said motor-controlling switching-means in respect to motor-operation or non-operation, said ground-circuit switching-means also having contacts for preventing the completion of the alternating-current grounding-circuit when the traction-motor means is in operation, and for completing the alternating-current grounding-circuit when the traction-motor means is not in operation.

5. A rectifier-powered vehicle having direct-current traction-motor means, a rectifier-assembly comprising at least two single-phase rectifying devices, supply-means for providing single-phase power on the vehicle, a transformer having a primary winding energized from said supply-means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current traction-motor circuit, said secondary winding having a mid-point connection which constitutes the other terminal of the direct-current traction-motor circuit, motor-controlling switching-means for controlling the motor-operating energization of each of said rectifying devices from said secondary winding, said motor-controlling switching-means having an actuating-means, means for at times providing an intentional direct-current grounding-circuit at some selected part of the direct-current traction-motor circuit, said part having a direct-current potential which is substantially different from the mid-point of the secondary winding when the traction-motor means is in operation, means for at times providing an intentional alternating-current grounding-circuit at some selected intermediate potential-level on the secondary winding, and changeover switching-means having an actuating-means which is responsive to the condition of said motor-controlling switching-means in respect to motor-operation or non-operation, said changeover switching-means also having contacts for completing the direct-current grounding-circuit and preventing the completion of the alternating-current grounding-circuit when the traction-motor means is in operation, and for completing the alternating-current grounding-circuit and preventing the completion of the direct-current grounding-circuit when the traction-motor means is not in operation.

6. A rectifier-powered vehicle having direct-current traction-motor means, a rectifier-assembly comprising at least two single-phase rectifying devices, a retractable current-collecting means for moving along an external alternating-current power-supply line, a transformer having a primary winding energized from said current-collecting means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current traction-motor circuit, said secondary winding having a mid-point connection which constitutes the other terminal of the direct-current traction-motor circuit, power-actuated retraction-means for at times retracting said current-collecting means out of contact with its external power-supply line, a vehicle-carried source of auxiliary-purpose power for actuating said retraction-means, motor-controlling switching-means for controlling the motor-operating energization of each of said rectifying devices from said secondary winding, means for at times providing an intentional alternating-current grounding-circuit at some selected intermediate potential-level on the secondary winding, switching-means having an actuating-means which is responsive to the condition of said motor-controlling switching-means in respect to motor-operation or non-operation, said switching-means also having contacts for preventing the completion of the alternating-current grounding-circuit when the traction-motor means is in operation, and for completing the alternating-current grounding-circuit when the traction-motor means is not in operation, a collector-short-circuiting means for at times providing a short-circuiting circuit across said power-supply line, said short-circuiting circuit including said retractable current-collecting means, an alternating-current protective-relay-means responsive to fault-currents in said alternating-current grounding-circuit due to an accidental alternating-current ground at some other point, said alternating-current protective-relay-means including means for causing an actuation of said collector-short-circuiting means, and further including means for then, in response to a cessation of substantial current-flow in said short-circuiting circuit, causing an energization of said retraction-means to actuate the same, and an auxiliary control means having an actuating-means which is responsive to the condition of operativeness of said vehicle-carried source of auxiliary-purpose power, said auxiliary control-means also having controlled-contact-means adapted to cause the initial completion of said intentional alternating-current grounding circuit only at a time when said vehicle-carried source of auxiliary-purpose power is in a satisfactory operating-condition.

7. The invention as defined in claim 6, characterized by said alternating-current protective-relay-means including means for first preventing the energization of the traction-motor means, and means for then, if a fault-current still continues, causing the actuation of said collector-short-circuiting means.

8. A rectifier-powered vehicle having direct-current traction-motor means, a rectifier-assembly comprising at least two single-phase rectifying devices, a retractable current-collecting means for moving along an external alternating-current power-supply line, a transformer having a primary winding energized from said current-collecting means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current tranction-motor circuit, said secondary winding having a mid-point connection which constitutes the other terminal of the direct-current traction-motor circuit, power-actuated retraction-means for at times retracting said current-collecting means out of contact with its external power-supply line, a vehicle-carried source of auxiliary-purpose power for actuating said retraction-means, motor-controlling switching-means for controlling the motor-operating energization of each of said rectifying devices from said secondary winding, means for at times providing an intentional direct-current grounding-circuit at some selected part of the direct-current traction-motor circuit, said part having a direct-current potential which is substantially different from the mid-point of the secondary winding when the traction-motor means is in operation, means for at times providing an intentional alternating-current grounding-circuit at some selected intermediate potential-level on the secondary winding, changeover switching-means having an actuating-means which is responsive to the condition of said motor-controlling switching-means in respect to motor-operation or non-operation, said changeover switching-means also having contacts for completing the direct-current grounding-circuit and preventing the completion of the alternating-current grounding-circuit when the traction-motor means is in operation, and for completing the alternating-current grounding-circuit and preventing the completion of the direct-current grounding-circuit when the traction-motor means is not in operation, a direct-current protective-relay-means responsive to fault-currents in the direct-current grounding-circuit, said direct-current protective-relay-means including means for putting the motor-controlling switching-means in a condition for discontinuing the motor-operation, a collector-short-circuiting means for at times providing a short-circuiting circuit across said power-supply line, said short-circuiting circuit including said retractable current-collecting means, an alternating-current protective-relay-means responsive to fault-currents in the alternating-current grounding-circuit due to an accidental alternating-current ground at some other point, said alternating-current protective-relay-means including means for causing an actuation of said collector-short-circuiting means, and further including means for then, in response to a cessation of substantial current-flow in said short-circuiting circuit, causing an energization of said retraction-means to actuate the same, and an auxiliary control means having an actuating-means which is responsive to the condition of operativeness of said vehicle-carried source of auxiliary-purpose power, said auxiliary control-means also having controlled-contact-means adapted to cause the initial completion of said intentional alternating-current grounding-circuit only at a time when said vehicle-carried source of auxiliary-purpose power is in a satisfactory operating-condition, said controlled-contact-means being further adapted to remove said intentional direct-current grounding-circuit when said vehicle-carried source of auxiliary-purpose power is not in a satisfactory operating-condition.

9. The invention as defined in claim 8, characterized by said alternating-current protective-relay-means including means for first preventing the energization of the traction-motor means, and means for then, if a fault-current still continues, causing the actuation of said collector-short-circuiting means.

10. A rectifier-powered vehicle having direct-current traction-motor means, a rectifier-assembly comprising at least two single-phase rectifying devices of a type having ignition-circuit means for making each rectifying device conductive at the beginning of each conducting period, supply-means for providing single-phase power on the vehicle, a transformer having a primary winding energized from said supply-means, and a secondary winding for supplying power from opposite sides of its mid-point and feeding said power to said two rectifying devices, respectively, at rectifying-device terminals of one polarity, circuit-means for connecting the other terminals of said two rectifying devices to constitute one terminal of the direct-current traction-motor circuit, said secondary winding having a mid-point connection which constitutes the other terminal of the direct-current traction-motor circuit, means for providing an intentional grounding-circuit at some selected part of the direct-current traction-motor circuit, a ground-detection relay for detecting fault-currents due to an accidental ground at some other place, said ground-detection relay having an operating coil and a holding coil, and also having an element for incapacitating the ignition-circuit means of the rectifying devices when the ground-detection relay is in its responsive condition, means for energizing said operating coil to be responsive to currents in said intentional grounding-circuit, means for energizing said holding coil with a steady current which is approximately at the holding-in value, during the normal fault-free operation of the traction-motor means, and means for increasing this holding-coil current to a holding-in value when said ground-detection relay is energized.

References Cited in the file of this patent
UNITED STATES PATENTS

| | | |
|---|---|---|
| 2,059,064 | Tritle et al. | Oct. 27, 1936 |
| 2,106,844 | Harder et al. | Feb. 1, 1938 |
| 2,576,518 | Knauth | Nov. 27, 1951 |